A. W. WISE.
WINDOW SCREEN.
APPLICATION FILED MAR. 15, 1918.

1,277,807.

Patented Sept. 3, 1918.

Witnesses
F. L. Gibson.
L. B. Middleton.

Inventor
Abe W. Wise.
By Victor J. Evans
Attorney

UNITED STATES PATENT OFFICE.

ABE W. WISE, OF CORINTH, MISSISSIPPI.

WINDOW-SCREEN.

1,277,807.   Specification of Letters Patent.   Patented Sept. 3, 1918.

Application filed March 15, 1918. Serial No. 222,667.

*To all whom it may concern:*

Be it known that I, ABE W. WISE, a citizen of the United States, residing at Corinth, in the county of Alcorn and State of Mississippi, have invented new and useful Improvements in Window-Screens, of which the following is a specification.

This invention relates to new and useful improvements in window screens and the principal object of the invention is to form a fly-trap therein which will cause the insects to pass from the room to the outside of the house and at the same time preventing insects from entering through said trap into the room.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
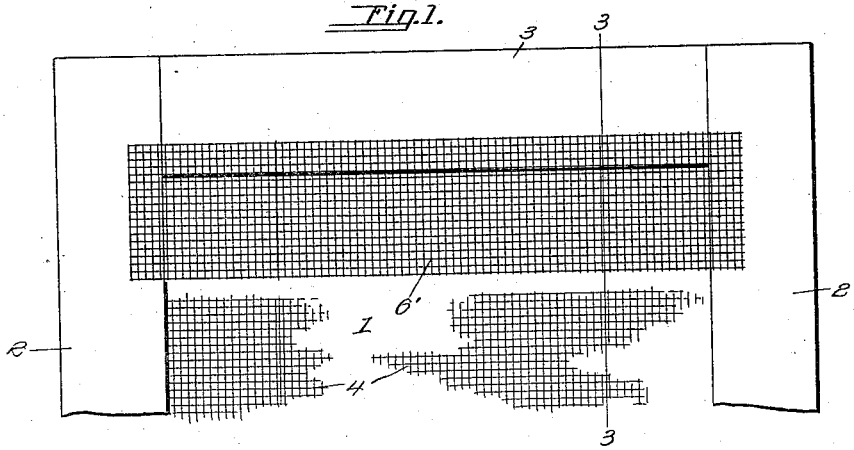
Figure 1 is a front view of the upper end of a window screen supplied with my invention.
Figure 2:
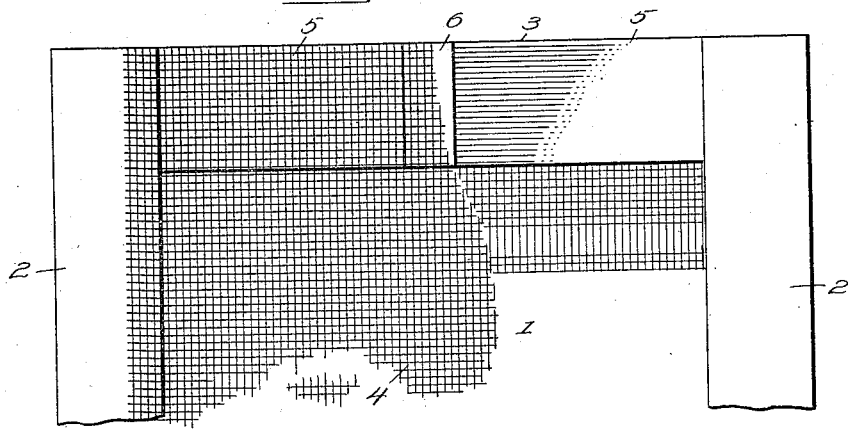
Fig. 2 is a rear view.
Figure 3:
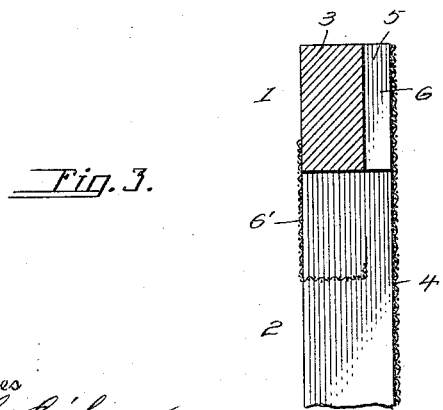

Fig. 3. is a section on line 3—3 of Fig. 1.

As shown in these views the screen 1 is made in the usual manner and consists of the two upright pieces 2 and the top connecting bar 3, the bottom bar not being shown. 4 represents the wire netting suitably secured to said bars. In carrying out my invention I cut away the top bar on the screen side to form slots 5 therein. I space these slots apart to leave projecting portions 6 to which the netting is secured. A sufficient number of these projecting portions are provided to secure a firm connection of the netting with the top bar. It will thus be seen that flies or other insects walking up the screen or netting will pass through said slots and thus emerge on the outer side of the window. I prefer to form a trap to insure the insects passing through said slots and this trap is formed on the inner side of the screen by means of an L-shaped piece of material 6', preferably wire netting, secured to the inner face of the top bar and having its bent edge projecting close to the inner surface of the upper part of the wire netting but leaving a space sufficient to permit the passage of the insects. Thus a box like inclosure is formed below the slots 5 to prevent the flies passing up the screen from entering the room again and insuring their passage through said slots.

It is thought from the foregoing description that the advantages and novel features of my invention will be readily apparent.

I desire it to be understood that I may make such changes in the construction and in the combination and arrangement of the several parts, provided that such changes fall within the scope of the appended claim.

What I claim is:—

A window screen having vertically extending slots formed in the screen face of its upper bar, said slots being spaced apart to leave projections to which the wire netting is secured, said netting extending to the top of the said upper bar and a strip of netting secured to the upper part of the screen on its other face, said strip having its lower end bent at right angles and extending to a point adjacent the netting so as to leave a space between said netting and said end.

In testimony whereof I affix my signature.

ABE W. WISE.

Copies of this patent may be obtained for five cents each, by addressing the "Commissioner of Patents, Washington, D. C."